R. S. CARLING.
VALVE.
APPLICATION FILED MAR. 28, 1917.

1,276,325.

Patented Aug. 20, 1918.

Inventor
Rose S. Carling
by Hazard & Miller
Att'ys.

UNITED STATES PATENT OFFICE.

ROSE S. CARLING, OF LOS ANGELES, CALIFORNIA.

VALVE.

1,276,325.    Specification of Letters Patent.    Patented Aug. 20, 1918.

Application filed March 28, 1917. Serial No. 158,047.

*To all whom it may concern:*

Be it known that I, ROSE S. CARLING, a citizen of the United States, residing at Los Angeles, in the county of Los Angeles and State of California, have invented new and useful Improvements in Valves, of which the following is a specification.

This invention relates to a valve and particularly pertains to a valve for pneumatic pads and the like.

It is the principal object of this invention to provide a valve for pneumatic pads which is compact in its construction and is so designed as to positively grip the contiguous edges of the pad in a manner to prevent leakage of air around the valve stem.

Another object of this invention is to provide a valve of the above description which is simple in its construction and possesses few parts.

It is a further object of this invention to provide a valve which may be readily mounted in position and which may be easily opened and closed, as desired.

Other objects will appear hereinafter.

The invention is illustrated, by way of example, in the accompanying drawings in which.

Figure 1:
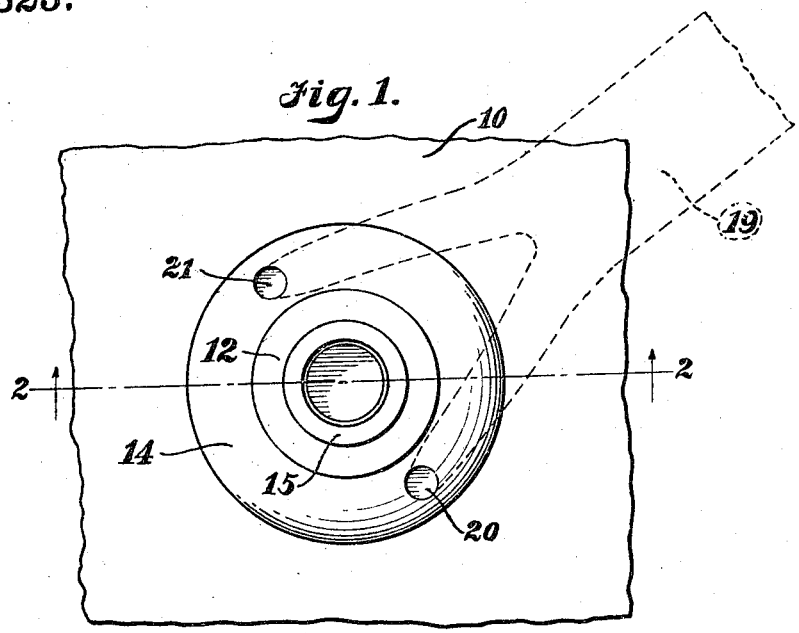
Figure 1 is a view in plan illustrating a fragmentary portion of a pad supplied with the valve and further disclosing the manner in which the valve is locked in position by a spanner wrench.
Figure 2:
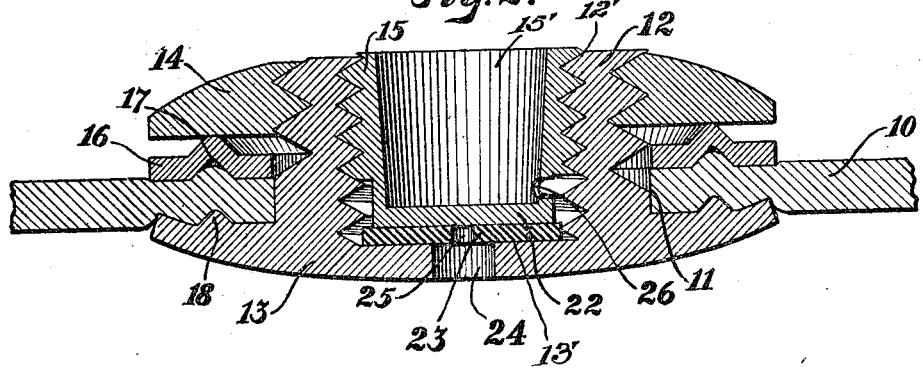
Fig. 2 is a view in transverse section as seen through the valve on the line 2—2 of Fig. 1 and particularly disclosing the formation and correlation of the component parts of the valve.

Referring more particularly to the drawings, 10 indicates a fabric wall of a pneumatic pad. This wall is formed with a circular opening 11 through which a threaded stem 12 of a valve member 13 projects. This stem is externally threaded and has an internally threaded bore 12' extending downwardly to the flat valve seat 13'. The external threads are adapted to accommodate a flat lock-nut 14, while the internal threads are adapted to adjustably secure a cylindrical valve member 15. The lock-nut 14 bears down upon a clamping washer 16. This washer is formed with an annular clamping groove 17 adapted to substantially register with an annular tongue 18 which is formed upon the body portion 13 of the valve and compresses the wall 10 of the pneumatic pad into the groove 17. As will be seen, this will cause the wall to be securely held and prevent it from drawing away from the stem of the valve when the pad is inflated or other strains are delivered thereto. The clamping washer 16 is securely held against the wall of the pad by the nut 14 which is tightened by a spanner wrench 19 which engages pins 20 and 21 upon opposite sides of the nut.

The cylindrical valve member 15 is formed with a central bore 15' extending downwardly to an end wall 22 which bears against valve washer 23. This washer is formed of rubber or other suitable material and is adapted to seat over the valve opening 24 in the valve body 13. An opening 25 is formed through the center of the washer and is normally closed by the end wall 22 of the valve member. When the valve member 15 is relieved from the washer, air may pass through a slot 26 in the side of the valve member and from thence beneath the valve through the openings 24 and 25 to the interior of the pad. A suitable tubular stem (not shown) is provided to rotate the valve member and also inflate the pad, after which the stem may be manipulated to clamp the valve washer 23 in position and close its opening 25, thus sealing the pad.

Especial attention is called to the flat valve seat 13', the rubber washer 23 resting upon the valve seat; there being a central opening 25 in the rubber washer communicating with the central opening 24 through the valve seat; and the solid end wall 22 pressing against the flat rubber washer all around the openings 24 and 25, and also to the tubular valve 15 having the central bore 15' leading down to the solid wall 22, and the slot 26 through the wall of the valve above the end wall 22; so that when the valve 15 is screwed down a perfect seal is secured and so that when the valve 15 is screwed up a passage is formed between the lower face of the end wall 22 and the upper face of the rubber washer 23 leading to the passage 26.

It will thus be seen that the device here set forth is simple in construction, compact in its design, and that it will permit a pneumatic pad to be readily inflated and sealed without danger of leakage around the valve stem and without the necessity of cementing the stem in place.

While I have shown the preferred form of my valve as now known to me, it will be understood that various changes in the combination, construction and arrangement of parts may be made by those skilled in the art without departing from the spirit of my invention.

I claim:

1. In a valve for pads and the like, a valve member having a central screw-threaded bore, a flat valve seat at the bottom of the bore, and a passage through the center of the valve seat, a flat rubber washer upon the flat valve seat and having a central opening communicating with the opening through the valve seat, and a second valve member screw-seated in the central bore of the first valve member and having a flat end wall engaging the upper flat face of the rubber washer and having a bore extending downwardly to the flat end wall; there being a passage leading through the side wall above the flat end wall; so that when the second valve member is screwed down upon the washer the passage is completely sealed and so that when the second valve member is screwed upwardly the passage is open through the flat valve seat, through the rubber washer, between the rubber washer and the flat end wall, and through the side wall passage.

2. A valve for pads and the like, comprising a valve member having a cylindrical stem exteriorly and interiorly threaded; there being a flat valve seat at the bottom of the interior thread and a central passage through the flat valve seat; a rubber washer upon the flat valve seat and having a central opening, a second valve member screw-seated in said cylindrical stem and having a flat end wall fitting upon the flat rubber washer and having a central bore extending downwardly to the flat end wall and having a side passage above the flat end wall, an annular flange formed around the inner end of the cylindrical stem and adapted to fit against the inner face of the pad, an annular tongue projecting upwardly from said flange, a clamping washer around the cylindrical stem and adapted to bear against the upper face of the pad and having an annular groove to match the annular tongue, and a nut screw-seated upon the cylindrical stem against the washer.

In testimony whereof I have signed my name to this specification.

ROSE S. CARLING.

Copies of this patent may be obtained for five cents each, by addressing the "Commissioner of Patents, Washington, D. C."